US008327427B2

(12) United States Patent
Soukup et al.

(10) Patent No.: US 8,327,427 B2
(45) Date of Patent: Dec. 4, 2012

(54) SYSTEM AND METHOD FOR TRANSPARENT SINGLE SIGN-ON

(75) Inventors: Martin Soukup, Ottawa (CA); Albert Reiche, Kanata (CA); Arn Hyndman, Ottawa (CA); Hongbo Li, Nepean (CA)

(73) Assignee: Rockstar Consortium US LP, Richardson, TX (US)

( * ) Notice: Subject to any disclaimer, the term of this patent is extended or adjusted under 35 U.S.C. 154(b) by 1130 days.

(21) Appl. No.: 11/526,789

(22) Filed: Sep. 25, 2006

(65) Prior Publication Data

US 2008/0092215 A1  Apr. 17, 2008

(51) Int. Cl.
*H04L 29/06* (2006.01)
*G06F 21/00* (2006.01)

(52) U.S. Cl. ............. 726/8; 726/1; 726/2; 726/3; 726/4; 726/5; 726/7; 726/16; 726/17; 726/19; 726/21; 726/26; 726/27; 726/30; 713/155; 713/159; 713/168; 713/172; 713/182; 713/185; 709/217; 709/219; 709/225; 709/226; 709/229

(58) Field of Classification Search ................ 726/1–21, 726/26–30; 713/153, 201, 155–159, 168–175, 713/182–186; 709/217–229
See application file for complete search history.

(56) References Cited

U.S. PATENT DOCUMENTS

| 6,243,816 | B1 * | 6/2001 | Fang et al. ......................... 726/5 |
| 6,892,307 | B1 * | 5/2005 | Wood et al. ....................... 726/8 |
| 7,296,290 | B2 * | 11/2007 | Barriga et al. .................... 726/8 |
| 2004/0059590 | A1 * | 3/2004 | Mercredi et al. .................. 705/1 |
| 2005/0108521 | A1 * | 5/2005 | Silhavy et al. ................ 713/156 |
| 2005/0278547 | A1 * | 12/2005 | Hyndman et al. ............ 713/185 |
| 2006/0075224 | A1 * | 4/2006 | Tao .............................. 713/164 |
| 2007/0180508 | A1 * | 8/2007 | Thomson .......................... 726/8 |

OTHER PUBLICATIONS

Operating System from Wikipedia; Published: Jan. 11, 2005.*
Single Sign-on Architectures by Jan De Clercq; Publisher: Springer-Verlag; Year: 2002.*
Single Sign-On Using Cookies for Web Applications by Vipin Samar; Publisher: IEEE; Year: 1999.*

* cited by examiner

*Primary Examiner* — Taghi Arani
*Assistant Examiner* — Madhuri Herzog
(74) *Attorney, Agent, or Firm* — Christopher & Weisberg, P.A.

(57) ABSTRACT

System and method for transparent single sign-on authentication on computers in a networked environment. A preferred embodiment comprises receiving an authentication request from an operating system of a first computer, requesting credentials of an application making the authentication request, authenticating the credentials, storing the credentials if the authentication is successful, and transmitting the credentials to a second computer. On subsequent access requests made by the user on the second computer, the credentials can be retrieved from the secure store, eliminating the need to prompt the user to re-enter authentication information.

21 Claims, 4 Drawing Sheets

SYSTEM AND METHOD FOR TRANSPARENT SINGLE SIGN-ON

TECHNICAL FIELD

The present invention relates generally to a system and a method for networked computing environments, and more particularly to a system and a method for single sign-on authentication on computers in a networked environment.

BACKGROUND

Networked computing has increased the functionality of computers by enabling computers that are physically located at different places to share information as well as applications. A networked computer can access applications and data stored on computers that are located far away, just as if the applications and the data are stored locally. This can increase efficiency since the applications and the data do not need to be installed at each computer, which could mandate a significant increase in computer management resources to provide necessary support. Furthermore, expenses can be reduced since application licenses do not need to be purchased for every computer that can potentially make use of the applications. Rather, a license that specifies a number of concurrently running copies of the application can be purchased and any number of computers can then execute the application, as long as the number is less than or equal to the licensed number.

With reference to FIG. 1, there is shown a diagram illustrating an exemplary networked computing environment 100. The exemplary networked computing environment 100 includes a first workstation 105 that is operated by a first user "user 1" and a second workstation 106 that is operated by a second user "user 2." The first workstation 105 and the second workstation 106 can be connected to a network 110 that permits the workstations 105 and 106 to access applications and data stored on a database server 115, a first server 120, a second server 125, another workstation 130, and so forth. The workstations 105 and 106 may be in close proximity to these other computers (located in the same room, building, or campus, for example) or the computers of the networked computing environment 100 may be located in different cities, states, countries, continents, and so forth. While the first workstation 105 is accessing applications and data stored on one or more of the other computers, the second workstation 106 can also be accessing applications and data stored on one or more of the same computers. For example, the first user on the first workstation 105 can be accessing data via the data-base 115 while the second user on the second workstation 106 may be authoring a data-base queries on the data-base 115.

Access to the applications and the data can be controlled by authenticating users. For example, before a user can launch an application, the user's identity may need to be authenticated. This can be achieved by interrogating the user to provide the requisite access requirements, such as account name and password. If the account name and password can be verified and the user is on an allowed list of users, then the application can be executed. Unfortunately, the need to enter repeatedly the access requirements to different applications and/or computers can become tedious over the course of a day's work.

In order to simplify the sharing of applications and data in the networked computing environment, a technique referred to as single sign-on (SSO) that requires a user to authenticate only one time per session within a given period of time can be used. As long as the user continues to access shared applications and data within a given time period, the user will not be required to authenticate each time new applications or data are accessed. SSO does not eliminate the need to authenticate the user, rather, the authentication occurs in the background, without requiring user input or intervention.

With reference now to FIG. 2, there is shown a diagram illustrating a prior art technique for implementing SSO in a networked computer environment. The diagram shown in FIG. 2 illustrates high-level views of software present in exemplary computers in the networked computer environment. The networked computer environment, as shown in FIG. 2, includes two computers, a first computer 200 and a second computer 250. The two computers are coupled together via a network (not shown). The first computer 200 includes a plurality of applications, such as application "app_1" 205 and application "app_N" 206.

The application "app_1" 205 has been modified to support SSO and in conjunction with an SSO plugin 210, which can be a custom designed application that is specifically written for the application "app_1" 205 and an operating system 220 executing on the first computer 200, users of the application "app_1" 205 can make use of SSO. The SSO plugin 210 can serve as an interface between the application "app_1" 205 and an SSO provider 215, operating as a bridge between the application "app_1" 205 and the SSO provider 215. The SSO provider 215 can provide the necessary support for single sign-on on the first computer 200, such as storage of authentication information, authorizing users, interfacing multiple applications, and so forth. The application "app_N" 206 has not been modified to support single sign-on, so there is no attendant SSO plugin. Although shown in FIG. 2 as being located in the first computer 200, the SSO provider 215 may be located on a remotely located, centralized host, for example, an SSO host or even on the second computer 250. In general, there is a single logical SSO provider 215 executing within a single networked computing environment.

When a user requests access to an application, such as the first application 205, the SSO plugin 210 can access the SSO provider 215 to authenticate the user. If the user is already authenticated, then the user can be permitted to access the application (if the user has adequate permission to do so). If the user has not been authenticated, then the user will need to authenticate and then access to the application can be granted. Although not shown, an SSO token (authentication information) can be passed between applications upon an attempt by a user to launch an application. For example, the SSO provider 215 can provide the SSO token to the first application 205, permitting the user to launch a second application "APP_2" 207. The SSO token may contain important information pertaining to the user as well as permission level, and so forth, and should therefore be protected to an adequate degree.

An operating system (OS) 220 provides functional control of the operations of the first computer 200, while a communications (COMM) stack 225 permits the first computer 200 to communicate with other computers in the networked computing environment. Different computers can utilize different operating systems, with examples of operating systems being Windows®, Unix, Linux, MacOS®, JAVA®, and so forth. The second computer 250 can contain a set of software applications, operating systems, SSO plugins, and communications stack that may be similar to or different from the first computer 200.

One disadvantage of the prior art is that an SSO plugin is required for every combination of application, application to be launched, SSO provider, and operating system used in the network computing environment. This can lead to a large number of different SSO plugins that will make support of the network computing environment expensive and potentially error prone.

Another disadvantage of the prior art is that if an SSO plugin is not available for a particular application, SSO provider, and operating system being used, then a different SSO application may be needed, with interoperability between different SSO applications not ensured.

A primary disadvantage of the prior art is that SSO tokens are transferred between the various applications, such as the requesting application, the application being requested, the SSO provider, the SSO plugin, and so forth. Extensions must be added to each SSO enabled application to ensure that the SSO tokens are transferred in a secure manner, particularly between applications on different computers in the networked environment.

SUMMARY OF THE INVENTION

These and other problems are generally solved or circumvented, and technical advantages are generally achieved, by preferred embodiments of the present invention which provides a system and a method for transparent single sign-on authentication on computers in a networked environment.

In accordance with a preferred embodiment of the present invention, a method for providing single sign-on to a user of a first computer in a networked computing environment is provided. The method includes receiving an authentication request from an operating system of the first computer, requesting credentials of an application making the authentication request, and authenticating the credentials. The method also includes storing the credentials and transmitting the credentials to a second computer, both in response to a successful authentication of the credentials.

In accordance with another preferred embodiment of the present invention, a network computing device is provided. The network computing device includes an operating system that controls interaction between users of the network computing device and applications and data stored in the network computing device, an authentication module coupled to the operating system, and a single sign-on module coupled to the operating system. The authentication module authenticates credentials of a user of the network computing device prior to granting the user access to applications and data and storing the credentials in a secure storage location, wherein once a user's credentials is present in the secure storage location, the user is no longer prompted to re-enter the authentication information and the single sign-on module transmits the user's credentials to a remotely located networked computing device containing remotely located applications or data and to verify the validity of received credentials.

In accordance with another preferred embodiment of the present invention, a networked computing environment is provided. The networked computing environment includes a computer network to convey information and data, and at least two network computing devices coupled to the network. Each network computing device includes an operating system that controls interaction between users of the network computing device and applications and data stored in the network computing device, an authentication module coupled to the operating system, and a single sign-on module coupled to the operating system. The authentication module authenticates credentials of a user of the network computing device prior to granting the user access to applications and data and storing the credentials in a secure storage location, wherein once a user's credentials is present in the secure storage location, the user is no longer prompted to re-enter the authentication information and the single sign-on module transmits the user's credentials to a remotely located networked computing device containing remotely located applications or data and to verify the validity of received credentials.

An advantage of a preferred embodiment of the present invention is that only a single application is required for each different operating system used in the networked computing environment to provide support for SSO with every application requiring authentication in the networked computing environment. If all of the computers in the network computing environment use a single operating system, then only a single application needs to be developed and installed on the various computers. Therefore, the costs associated with supporting SSO can be small and implementation can be rapid.

A further advantage of a preferred embodiment of the present invention is that since the present invention is an add-on to the operating system of the computer, regardless of the number of different applications executing on a computer, only a single application is required to support SSO on the computer. The presence of the present invention is transparent to the applications and they continue to operate as before. Therefore, interoperability between applications in the networked computing environment can be readily achieved since the applications do not need to be modified nor do plugins need to be created for each application. Furthermore, the need to develop a single application can reduce the chance of problems and errors occurring.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a networked computing environment containing computers that will permit authenticated users to access applications and data, wherein the users and the applications and data may be located on a single computer or different computers. The invention may also be applied, however, to other multiuser computer systems, such as network appliances connected to a resource network, a computer connected to a server via a public network (such as an Internet Protocol network), and so forth, wherein there is a desire to enable users access to applications and data stored anywhere on a network as long as the users have been authenticated, without forcing the users to repeatedly enter authentication information.

The applications and/or data that a user may wish to access can be categorized into one of two groups based on storage location. The applications and/or data can be stored locally or remotely. Locally stored implies that the applications and/or data is resident on some form of storage that is part of the same computer that the user is using, while remotely stored implies that the applications and/or data is resident on some form of storage on a computer or device that is coupled to the computer that the user is using by a network connection.

Figure 1:
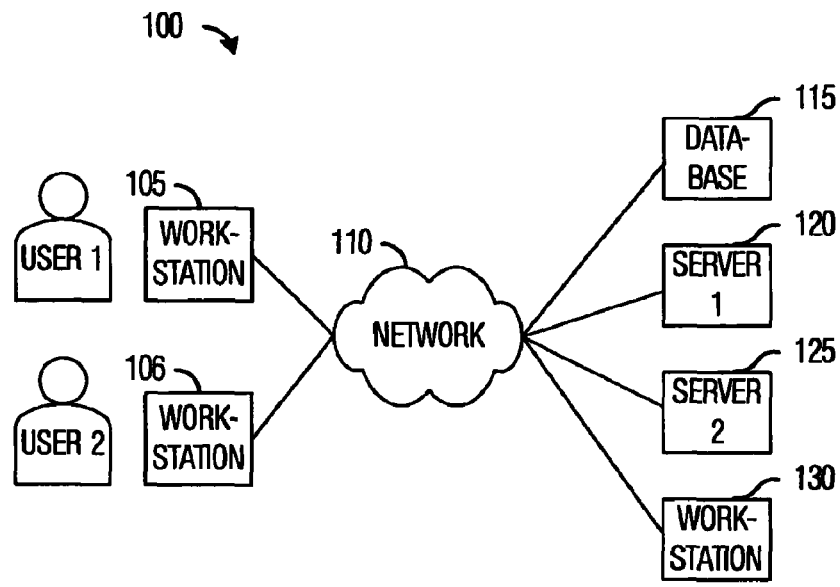
FIG. 1 is a diagram of an exemplary networked computing environment.
Figure 2:
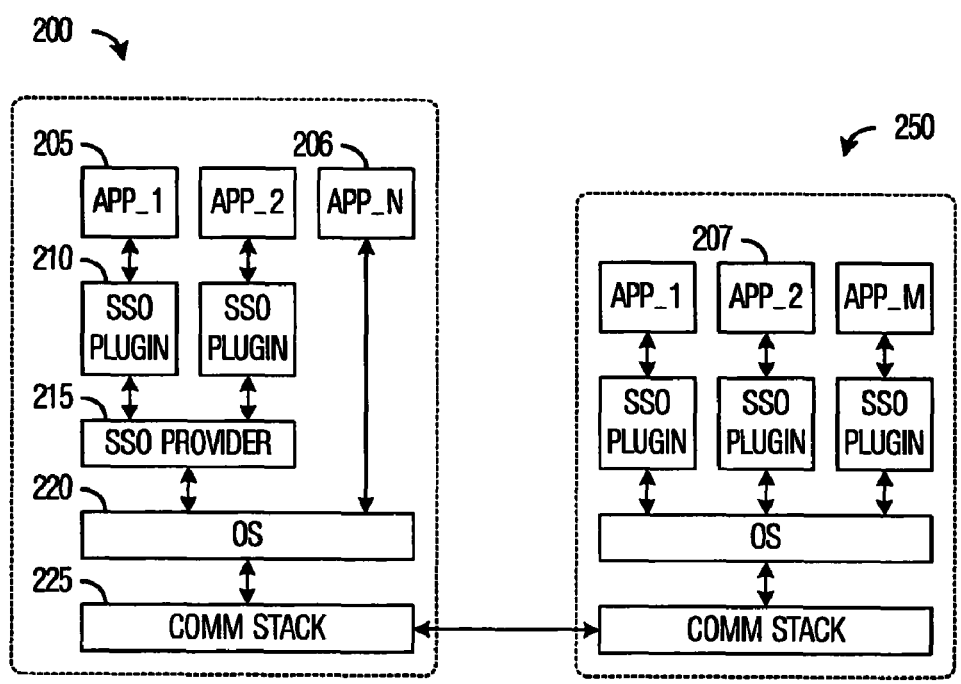
FIG. 2 is a diagram of a prior art single sign-on implementation.
Figure 3:
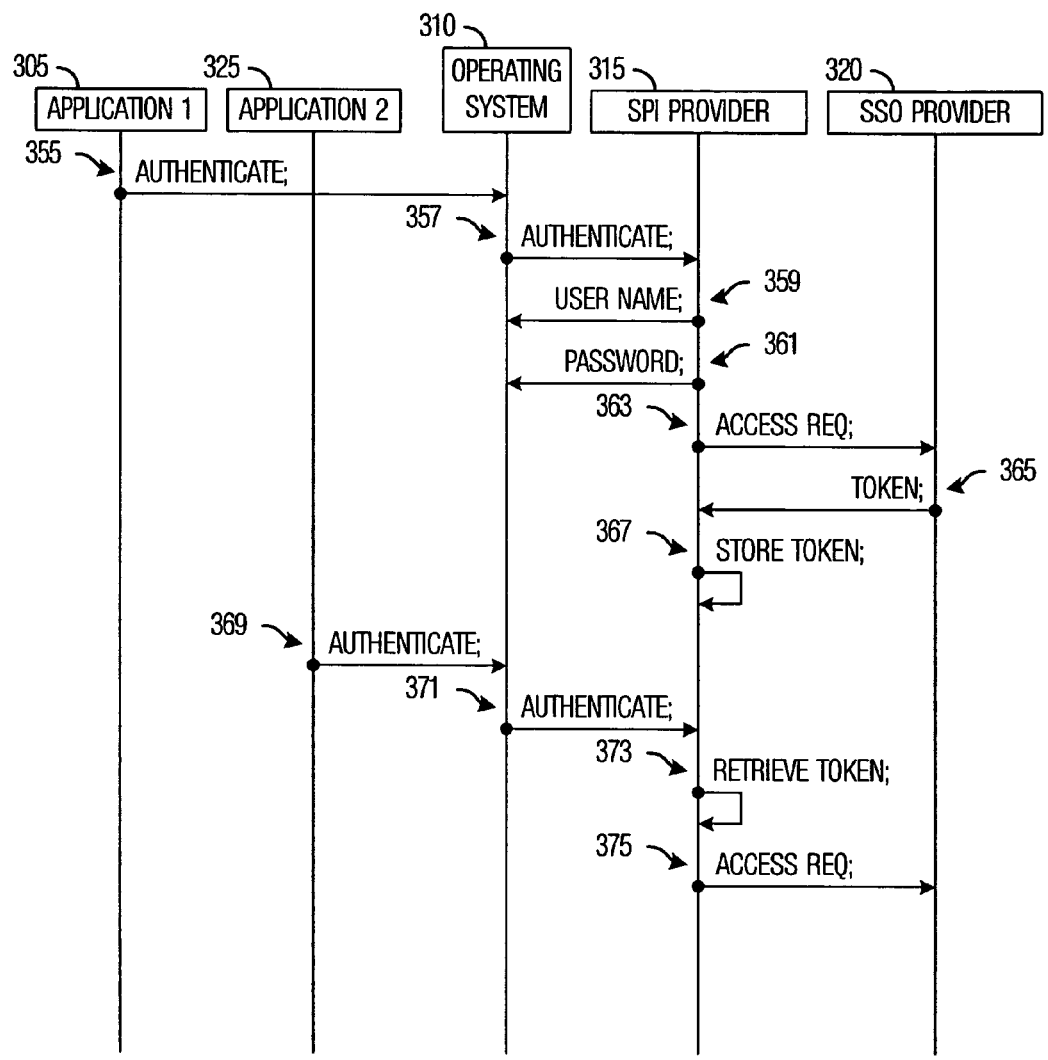
FIG. 3 is a sequence diagram of the authentication of a user attempting to access an application, according to a preferred embodiment of the present invention.

With reference now to FIG. 3, there is shown a sequence diagram illustrating an authentication of a user attempting to access an application, wherein the application is locally stored, according to a preferred embodiment of the present invention. The time-space diagram shown in FIG. 3 illustrates the authentication of a user as the user attempts to access two different applications on a computer with SSO support provided by an operating system level module. When the user attempts to access a first application 305, an authentication request can be generated by the first application 305 and directed to an operating system (OS) 310 of the computer (the authentication request is shown in FIG. 3 as event 355). At the OS 310, the authentication request can be directed by the OS 310 to a service provider interface (SPI) provider 315.

According to a preferred embodiment of the present invention, the SPI provider 315 can be a specially developed application that can serve as an intermediary between the OS 310 and a SSO provider 320 and handle necessary operations to support SSO, such as authentication token storage, authentication token verification, authentication token retrieval, and so forth. The SPI provider 315 may need to be customized depending upon the OS 310 and the SSO provider 320, which can also be an authentication server, of the computer. For example, for Unix based computer systems, the SPI provider 315 can be created to interface between UNIX Pluggable Authentication Modules (PAM) and a Radius authentication server. For other operating systems, different SPI providers s may be needed for proper interface between the operating system and the SSO provider, such as authentication module SPIs for Java Authentication and Authorization Service (JAAS) for JAVA® based computers and Graphical Identification and Authentication (GINA) for Windows® based computers. However, the SPI provider 315 is independent of the applications installed on the computer and a single SPI provider 315 can suffice for all installed applications on a single computer.

When the SPI provider 315 receives the authentication request, the SPI provider 315 can determine if the user's authentication information is stored in a secure storage location (not shown). If the user's authentication information is not stored in the secure storage location, then it will be necessary to authenticate the user. This can be achieved by transmitting requests for the user's "user name" and "password" or some other credentials to the OS 310. These requests are shown as event 359 ("user name" request) and event 361 ("password" request). The OS 310 can then prompt the user to enter the "user name" and "password" (not shown).

After the user provides the required authentication information, the SPI provider 315 can make use of the SSO provider 320 to verify the user (event 363). The SSO provider 320 may be executing on the same computer as the SPI provider 315 or it may be executing on a remotely located computer. When the user has been verified (authenticated), the SSO provider 320 can return to the SPI provider 315 an authentication token for the user (event 365). The authentication token does not contain precious, secret credential information about the user making its storage much more secure than the storage of secret credentials. The SPI provider 315 can store the authentication token for later use (event 367) in a secure storage location, such as a token cache, for subsequent use. With the successful authentication, the user can be granted access to the first application 305, although it is possible for the user to be successfully authenticated and still not be granted access to an application. For example, in a networked computing environment that implements access levels, the user may not have adequate access permission to access certain applications.

After successfully obtaining access to the first application 305, the user attempts to access a second application 325. When the user attempts to access the second application 325, a second authentication request can be generated by the second application 325 (event 369) and directed to the OS 310. As with the authentication request generated by the first application 305, at the OS 310, the second authentication request can be directed to the SPI provider 315 (event 371).

Since the user has previously been authenticated, the SPI provider 315 can check in its secure storage location for the authentication token and finds the necessary information (event 373).

According to a preferred embodiment of the present invention, safeguards can be present to help improve the security of the authentication. For example, if the user has been idle for an extended period of time, then the authentication token may expire and be removed from the secure storage location. If this is the case, then the user may need to be re-authenticated. Even with a valid authentication token, the SPI provider 315 will need to obtain permission from the SSO provider 320 prior to granting the user access to the second application 325 (event 375).

Depending upon the implementation of the networked computing environment, the user may need to meet other criteria before being granted access to the application. For example, the user may need to be listed on a list of allowed users, the user may belong to a group that is allowed access, and so forth. This can be used to prevent the user from accessing applications that require permissions that are greater than those assigned to the user. For example, the user may be assigned a medium access level and therefore must be prevented from accessing high access level applications and data. With the successful authentication, the user can be granted access to the second application 325. To provide an additional level of security, the user may be required to provide additional authentication information, such as multiple passwords and/or biometric information (finger prints, retina scans, and so forth). The requirement of the additional passwords and/or biometric data can significantly increase the level of the security of the networked computing environment.

When the applications and/or data are remotely stored, SSO can follow roughly the same authentication framework as for the case when the applications and/or data are locally stored. However, several additional operations are needed to share the SSO token that is exchanged between computers over the network connecting the computers and ensure its validity.

Figure 4:
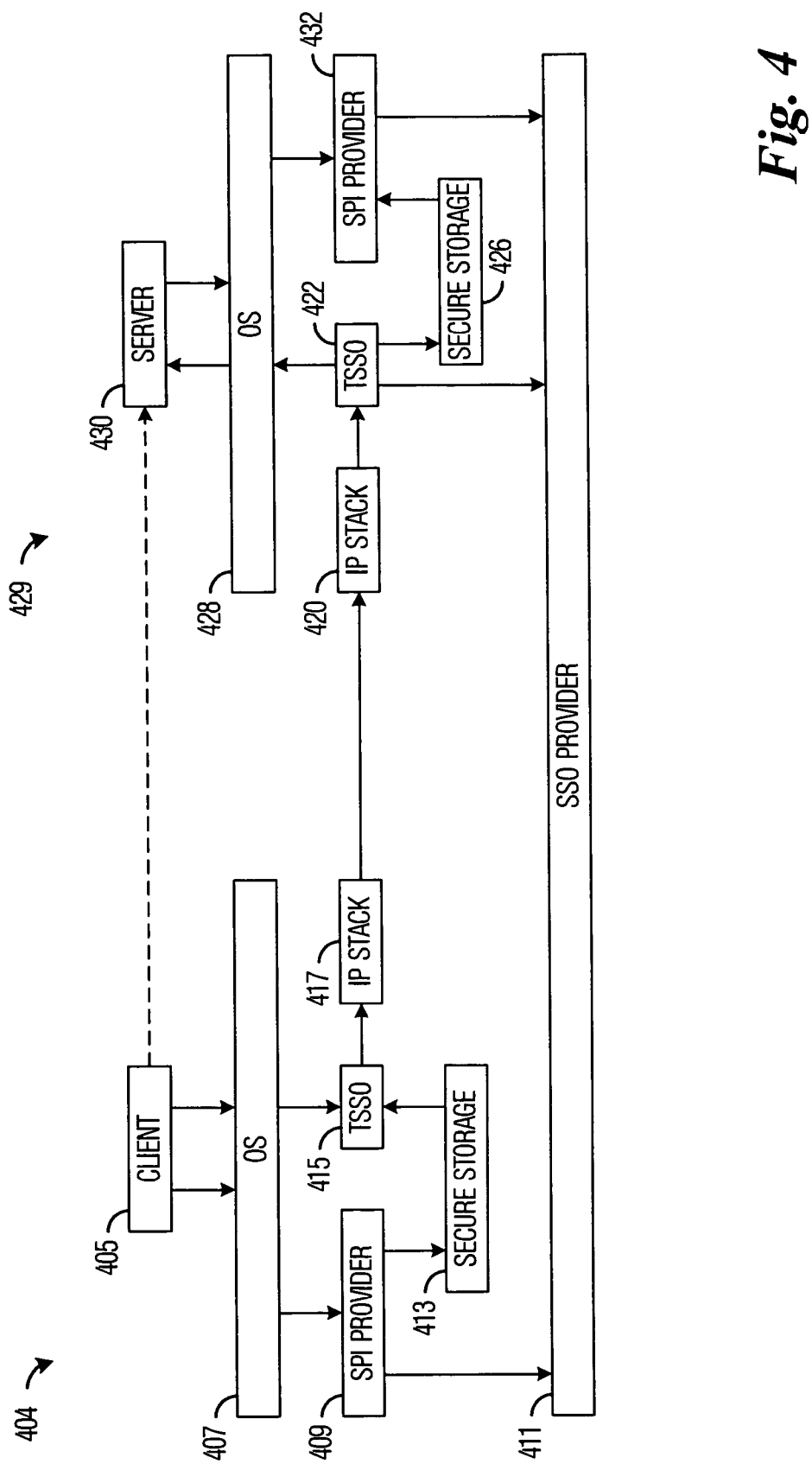
FIG. 4 is a diagram of a pair of networked computing devices showing the authentication of a user attempting to access applications and/or data, according to a preferred embodiment of the present invention.

With reference now to FIG. 4, there is shown a diagram illustrating a pair of networked computing devices showing the authentication of a user attempting to access applications and/or data, wherein the applications and/or data are locally stored on a local computer 404 and remotely stored on a remote computer 429, according to a preferred embodiment of the present invention. The diagram shown in FIG. 4 illustrates the interaction between software modules present on the local computer and the remote computer. The user, making use of a client 405 on the local computer 404, initially makes an attempt to access an application and/or data that is stored on the local computer 404. The access attempt can lead to the generation of an authentication request that can be sent to an operating system (OS) 407 of the local computer 404. The OS 407, after determining that the application and/or the data that the user is attempting to access is locally stored, can forward the authentication request to an SPI provider 409.

The SPI provider 409 can then transmit a verification request to an SSO provider 411, which may be an authentication server, to authenticate the user. The SSO provider 411 can be a remotely located computer that is connected to the local computer 404 by the network, or the SSO provider 411 may be located on either the local computer 404 or the remote computer 429 (but not both). The SPI provider 409 can also transmit an authentication token or other restricted credentials provided by the SSO provider 411 to a secure storage 413. If the authentication request is successful, then the user can then be granted access to the application and/or data.

The user can also make an attempt to access an application and/or data that is stored on the remote computer 429. The access attempt can lead to the generation of a request, such as an Internet Protocol request, that can be sent to the OS 407. The OS 407 can send the request to the inter-host transparent SSO (TSSO) 415. Like the SPI provider 409, the TSSO 415 can serve as a bridge between the OS 407 and the remote computer 429, providing necessary support for SSO with the remote computer 429.

The TSSO 415 can request the user's SSO information from the secure storage 413. After retrieving the user's SSO information from the secure storage 413, the TSSO 415 can make use of the local computer's communications stack, for example, an IP stack 417, to transmit the user's SSO information to the remote computer 429.

At the remote computer 429, a communications stack, such as a second IP stack 420, receives the user's SSO information transmitted by the local computer 404. A second TSSO 422 can then receive the user's SSO information. The second TSSO 422 can authenticate (verify) the user's SSO information with the SSO provider 411. A purpose of the authentication can be to prevent corruption (either intentional or unintentional) of a second secure storage 426 of the remote computer 429, for example. After the user's SSO information has been verified, the SSO information can be stored in the second secure storage 426.

To help improve the security of the transmission of the SSO information, computers in the networked computing environment can each contain a list of computers from which they will accept SSO information. If a computer in the networked computing environment receives SSO information from a computer that is not in its list, then the computer can refuse to act on the transmission. In another technique to help improve the security of the networked computing environment, computers involved in the transmission of the SSO information may undergo mutual authentication prior to completing the transmission. A further technique can involve permitting updates to the secure storage only at specified times. If new SSO information arrives at a computer outside of a specified time, then the computer will not act on the transmission.

With the user's SSO information verified and stored on the remote computer 429, the processing of the request (the Internet Protocol request) can be continued. The processing can continue with the second TSSO 422 transmitting the request to a second OS 428. The second OS 428 then forwards this request to the server 430. The server 430 receives the request and knows the client 405 wants to gain access to its services or data. The server 430 must authenticate the user of this client 405 through a second authentication request. Since the requested application and/or data is stored locally with respect to the remote computer 429, the subsequent processing of the second authentication request is similar to the local authentication request discussed previously. The server 430 can forward the second authentication request to the second OS 428.

Since the second authentication request is for access to an application and/or data that is locally stored, the second authentication request can be provided to a second SPI provider 432. The second SPI provider 432 can then retrieve the user's SSO information from the second secure storage 426 and verify the user's authentication state with the SSO provider 411. If the user has adequate permission for access to the application and/or data, the access can be granted. Depending upon the implementation of the networked computing environment, the user may need to meet other criteria before being granted access to the application. For example, the user may need to be listed on a list of allowed users, the user may belong to a group that is allowed access, the local computer may need to be on a list of allowed computers, and so forth.

A preferred embodiment of the present invention comprises the SPI provider 409 and the TSSO 415, with the SPI provider 409 being used to perform local application and/or data access authentication and the TSSO 415 being used to transfer the user's SSO information between the local computer 404 and the remote computer 429. Once again, since the SPI provider 409 and the TSSO 415 are written for a specific operating system, a single implementation of an SPI provider and a TSSO is sufficient for each supported operating system in the networked computing environment. Applications installed on a computer do not need to be aware of the presence of the SPI provider 409 or the TSSO 415. To request access to applications and/or data, an application only needs to issue a request to the operating system and the processing of the access request can be performed transparently.

Figure 5A:
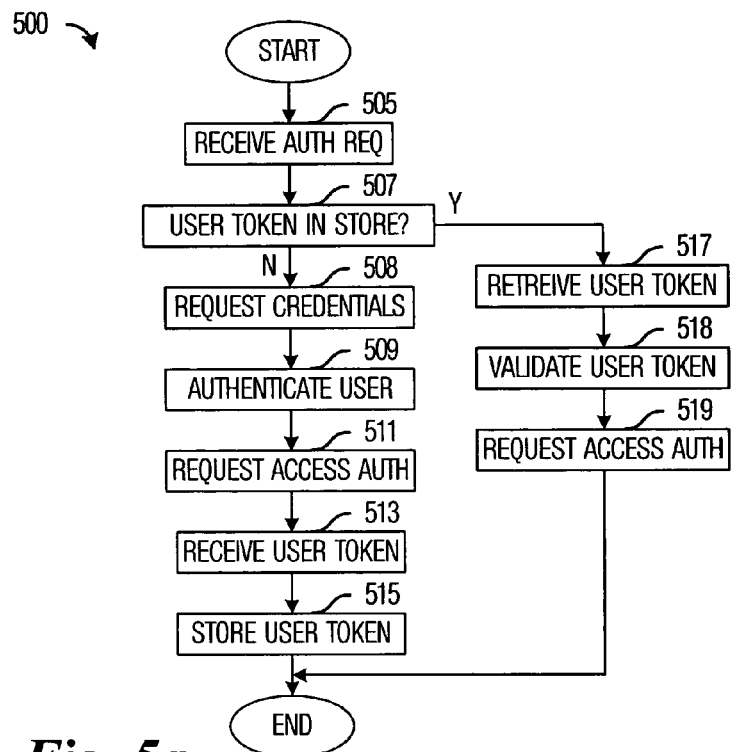
FIGS. 5a through 5d are diagrams of algorithms supporting single sign-on in a networked computing environment, according to a preferred embodiment of the present invention.

With reference now to FIGS. 5a through 5d, there are shown diagrams illustrating algorithms for supporting SSO in a networked computing environment, according to a preferred embodiment of the present invention. An algorithm 500 shown in FIG. 5a illustrates operations that can take place in a computer in a networked computing environment processing a request for access to an application and/or data that is located at the computer, i.e., the application and/or data are located locally. The algorithm 500 can be implemented in an SPI provider, such as the SPI provider 409 (FIG. 4). The execution of the implementation of the algorithm 500 can begin when the SPI provider 409 receives an authentication request from an OS (block 505), such as the OS 407. The authentication request can be generated as a part of a request by a user at the computer for access to an application and/or data that is located at the computer. For example, the user may double-click on an icon representing an application in an attempt to launch the application. The authentication request from the OS 407 can contain information, such as the application and/or data that the user wishes to access, user information, and so forth. The SPI provider 409 can then check in a secure storage, such as the secure storage 413, to determine if the user's SSO information is stored in the secure storage 413 (block 507).

If the user's SSO information is not stored in the secure storage 413, then the SPI provider 409 can request the user to enter the needed authentication information (block 508) by transmitting an authentication request to the OS 407. The OS 407 can then prompt the user to enter their "user name" and "password," for example. As the user enters the needed authentication information, the user's identity will need to be authenticated (block 509). After the user's identity has been authenticated, the SPI provider 409 can check to determine if the user has adequate permission to access the requested application and/or data (block 511). The permission check can be made with an authentication server, such as the SSO provider 411.

If the SSO provider 411 determines that the user has sufficient permission to access the requested application and/or data, the SSO provider 411 can return an authentication token, which can contain SSO information, that can be received by the SPI provider 409 (block 513). The SPI provider 409 can save the user's authentication token in the secure storage 413 and the user can be allowed to access the application and/or data.

If the user's SSO information is stored in the secure storage 413 (block 507), then the SPI provider 409 can retrieve the user's SSO information, typically in the form of an authentication token, from the secure storage 413. Even with the authentication token, the SPI provider 409 must verify the token's validity (block 518) and may still need check to determine if the user has adequate permission to access the requested application and/or data (block 519). Although the user's authentication token was found in the secure storage 413, the check of the user's permission level is still required to ensure that the user is not granted access to applications and/or data that requires a higher permission level. If the user has adequate permission to access the application and/or data, then the user can be allowed to access the application and/or data.

Figure 5B:
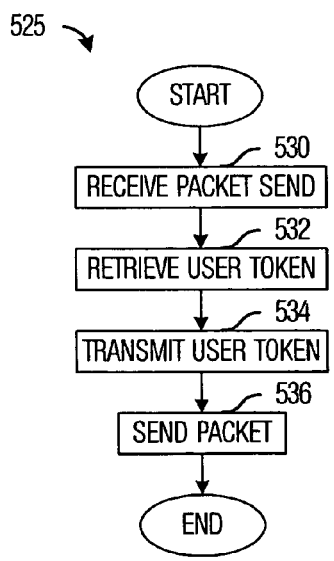
Figure 5C:
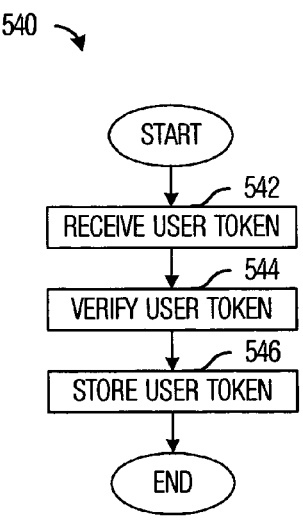
Figure 5D:
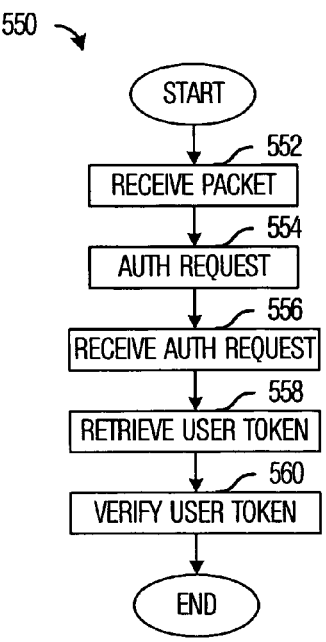

Algorithms shown in FIG. 5*b* (algorithm 525), FIG. 5*c* (algorithm 540), and FIG. 5*d* (algorithm 550) illustrate operations that can take place in computers in a network computing environment processing a request for access to an application and/or data that is remotely located from a computer that is being used by a user making the request for access, with the algorithm 525 shown in FIG. 5*b* illustrating operations that can take place at the remote computer being used by the user (client side) and the algorithms 540 and 550 shown in FIGS. 5*c* and 5*d* illustrate operations that can take place at the remote computer containing the application and/or data (server side).

The algorithm 525 shown in FIG. 5*b* illustrates operations that can take place in a local computer being used by a user making a request for access to an application and/or data stored on a remote computer, according to a preferred embodiment of the present invention. The algorithm 525 can be implemented in a TSSO, such as the TSSO 415 (FIG. 4). The execution of the implementation of the algorithm 525 can begin when the TSSO 415 receives an remote connect request from the OS 407, in the form of a packet send (block 530). After the TSSO 415 receives the packet the TSSO 415 can access the secure storage 413 to retrieve the user's SSO information, typically in the form of the user's authentication token (block 532). If the user's authentication information is not in the secure storage 413, then it will be necessary to authenticate the user's identity in a manner similar to that describe previously in the discussion of FIG. 5*a*. After obtaining the user's SSO information, the TSSO 415 can transmit the user's SSO information to the remote computer via a communications stack, such as the IP stack 417 (block 534) and then send the packet (block 536). In an alternate embodiment, it is possible to skip the transmission of the SSO information (block 534) if the SSO information has been previously transmitted to the specific remote OS within a given time period.

The algorithm 540 shown in FIG. 5*c* illustrates operations that can take place in the remote computer that contains an application and/or data that is requested by the user on the local computer, when the remote computer first receives the transmission, according to a preferred embodiment of the present invention. The algorithm 540 can be implemented in a TSSO in the remote computer, such as the second TSSO 422 (FIG. 4). The execution of the implementation of the algorithm 540 can begin when the second TSSO 422 receives the user's SSO information transmitted by the local computer (block 542). To prevent contamination of SSO information, the second TSSO 422 can verify the user's SSO information using an authentication server, such as the SSO provider 411 (FIG. 4) (block 544). For example, without verification, it is possible to maliciously provide forged user SSO information to the remote computer, which would then result in the forged user SSO information being stored in a secure storage, such as the second secure storage 426, of the remote computer. After the second TSSO 422 verifies the user's SSO information, the second TSSO 422 can store the user's SSO information in the remote computer's secure storage, such as the second secure storage 426 (FIG. 4) (block 546).

The algorithm 550 shown in FIG. 5*d* illustrates operations that can take place in the remote computer that contains an application and/or data that is requested by the user on the local computer, wherein the remote computer has already received the user's SSO information, according to a preferred embodiment of the present invention. After the second TSSO 422 verifies the user's SSO information (block 544) and stores the SSO information in the second secure storage 426 (block 546), the first TSSO 415 can forward the packet to an OS of the remote computer, such as the second OS 428 (FIG. 4), which forwards the packet to a server, such as the second server 430 (FIG. 4), of the remote computer (block 552). The second server 430 then makes an authentication request to the second OS 428 to authenticate the user of the client (block 554).

The processing of the authentication request can be completed by the SPI provider 432 of the remote computer. The SPI provider 432 can receive the authentication request from the second OS 428 (block 556). The SPI provider 432 can then retrieve the user's SSO information (block 558) and verify the authentication request (block 560) utilizing processing that is similar to the processing illustrated in algorithm 500, shown in FIG. 5*a*. With the authentication request verified, the access to the application and/or data can be allowed.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing single sign-on to a user of a first device of a plurality of devices in a networked computing environment, the method comprising:
   controlling a plurality of applications on said first device by an operating system, the plurality of applications communicating with said operating system, said operating system generating an authentication request on behalf of the plurality of applications, said operating system coupled to only one single sign-on (SSO) interface located at said first device;
   receiving the authentication request generated by said operating system of the first device at said SSO interface located at said first device, said single sign-on interface coupled to a SSO provider, and said operating system supporting each of said plurality of applications on said first device;
   determining if authentication information required by said authentication request is available to said single sign-on interface from a storage location located on said first device, and if not available, requesting credentials required to authenticate said user for using an application making the authentication request;
   authenticating the credentials with information located in said SSO provider, said SSO provider used by each of said plurality of devices; and
   in response to a successful authentication of the required credentials, storing data indicative that the credentials have been authenticated at said storage location on said first device.

2. The method of claim 1, further comprising transmitting the credentials to a second device of said plurality of devices, wherein the transmitting occurs when network traffic is initiated from the first device to the second device.

3. The method of claim 1, wherein the user makes use of an application to create the authentication request, and the method further comprising transmitting the authentication request from the application to the operating system prior to the receiving.

4. The method of claim 1, wherein at least one of the plurality of applications creates the authentication request when the user attempts to access a second application or data.

5. The method of claim 1, wherein the credentials are only transmitted periodically.

6. The method of claim 1, wherein the authentication information required by said authentication request is determined to be present at said storage location and further comprising:
   retrieving the data indicative of authenticated credentials from said storage location in response to the determination that the credentials are available and located in the storage location.

7. The method of claim 1, wherein the authenticating the credentials comprises using an authentication server.

8. The method of claim 1, wherein the determining if authentication information required by said authentication request is available to said single sign-on interface is performed in response to a determination that the credentials located in the storage location are no longer valid.

9. The method of claim 8, wherein the stored data indicative that the credentials have been authenticated are no longer valid if the user has not been actively utilizing the first device for a specified period of time or if the stored data are older than a permitted age.

10. The method of claim 1, wherein the data indicative that the credentials have been authenticated are the credentials and the storing comprises placing the credentials in a secure storage location.

11. The method of claim 1 further comprising after the storing, receiving a transmission packet containing a target host containing the target of the authentication request and wherein the second device comprises the target host.

12. A first network computing device in a SSO (single sign-on) network computing environment that includes a plurality of network computing devices, the first network computing device comprising:
   an operating system configured to control interaction between users of the first network computing device and a plurality of applications and data stored in the first network computing device, the operating system generating an authentication request on behalf of the plurality of applications;
   a single authentication module coupled to the operating system, the single authentication module comprising a SSO interface coupled to a SSO provider, and the SSO interface receiving the authentication request and the single authentication module configured to support each of said plurality of applications and data, and to determine that the required information to authenticate credentials of a user of the first network computing device is available prior to granting the user access to said plurality of applications and data and storing the required authentication information of the user's credentials in a storage location, wherein once a user's authentication information is present in the storage location, the user is no longer prompted to re-enter the authentication information; and
   a SSO module coupled to the operating system of the first network computing device and said SSO provider, said SSO module used by each of said plurality of network computing devices.

13. The first network computing device of claim 12, wherein if a user's credentials are not in the storage location when the single authentication module is processing an access request from the user, the single authentication module causes the operating system to prompt the user for authentication information.

14. The first network computing device of claim 13, wherein the SSO provider is an authentication server, and the user's authentication information is forwarded to the authentication server for authentication.

15. The first network computing device of claim 12, wherein the single authentication module and the SSO module are unique to the operating system.

16. A networked computing environment comprising:
   a computer network to convey information and data;
   at least two network computing devices coupled to the computer network, each network computing device comprising an operating system configured to control interaction between users of the network computing device and a plurality of applications and data stored in the network computing device, the operating system generating an authentication request on behalf of the plurality of applications;

a single authentication module coupled to the operating system, the single authentication module comprising a single sign-on (SSO) interface coupled to a SSO provider and the SSO interface receiving the authentication request and the single authentication module configured to support each of said plurality of applications and data stored in said network computing device and to determine that the required information to authenticate credentials of a user of the network computing device is available prior to granting the user access to said plurality of applications and data and storing the required information to authenticate the user's credentials in a secure storage location, wherein once a user's authentication information is present in the storage location, the user is no longer prompted to re-enter the authentication information; and a SSO module for each of said at least two computing devices coupled to the operating system and the SSO provider, the single sign on SSO module being used by each of said at least two computing devices and being configured to transmit data indicative of the user's credentials to another networked computing device that is remotely located and that contains applications or data and to verify the validity of received credentials.

17. The networked computing environment of claim 16, wherein a SSO module of a first networked computing device transmits the user's credentials to a second networked computing device.

18. The networked computing environment of claim 17, wherein another single authentication module at the second networked computing device verifies the user's authentication information utilizing an authentication server of the networked computing environment.

19. The networked computing environment of claim 16, wherein different networked computing devices utilize different operating systems, and wherein for each operating system, a single implementation of the single authentication module and the SSO module is used.

20. The networked computing environment of claim 16, wherein different applications are installed in the networked computing environment, and wherein the applications are unaware of the presence of the single authentication module and the SSO module.

21. The first network computing device of claim 12, wherein the SSO module is configured to transmit data indicating authentication of the user's credentials to a second network computing device that is remotely located and containing applications or data to verify the validity of received credentials.

* * * * *